United States Patent [19]

Midden

[11] Patent Number: 5,372,728

[45] Date of Patent: Dec. 13, 1994

[54] GROUNDS REMOVAL MECHANISM

[75] Inventor: William E. Midden, Springfield, Ill.

[73] Assignee: Bunn-O-Matic Corporation, Springfield, Ill.

[21] Appl. No.: 7,476

[22] Filed: Jan. 22, 1993

[51] Int. Cl.$^5$ ............................................. B01D 37/04
[52] U.S. Cl. ................... 210/770; 210/416.1; 426/433; 99/289 R; 99/300
[58] Field of Search ............... 34/109; 99/289 R, 300; 210/767, 768, 770, 416.1; 426/433

[56] References Cited

U.S. PATENT DOCUMENTS

| | | |
|---|---|---|
| 3,683,790 | 8/1972 | Black et al. |
| 4,709,625 | 12/1987 | Layre et al. ........................ 99/289 R |
| 4,873,916 | 10/1989 | Piscaer ................................ 99/289 R |
| 4,903,586 | 2/1990 | King .................................... 99/289 R |
| 4,936,199 | 6/1990 | Ruggin et al. ..................... 99/289 R |
| 5,134,925 | 8/1992 | Bunn et al. |
| 5,153,016 | 10/1992 | Gockelmann ..................... 99/289 R |

*Primary Examiner*—Robert A. Dawson
*Assistant Examiner*—W. L. Walker
*Attorney, Agent, or Firm*—Trexler, Bushnell, Giangiorgi & Blackstone, Ltd.

[57] ABSTRACT

A disposal device for disposing of spent beverage brewing substances for use with a beverage brewing apparatus. The beverage brewing apparatus is the type which produces a brewed beverage from a beverage brewing substance disposed in a brewing chamber and infused with a liquid. A drain conduit extends from the brewing chamber and communicates with the substance disposal device for removing a slurry of moist beverage brewing substance and liquid waste from the brewing chamber of the apparatus into the disposal device. The disposal device includes a housing and a filter assembly which are controllably displaceable relative to each other. When the housing and filter assembly are assembled, they define a chamber. The filter assembly has a filter material which drains a liquid component out of the slurry when the slurry is dispensed into the chamber. A drain port communicates with the chamber for removing the liquid component from the chamber. An evacuating device communicates with the chamber and creates a vacuum on the chamber when activated to assist in removing the liquid component from the slurry. Once a substantial portion of the liquid component is removed from the slurry under the influence of the evacuating device, the housing and filter assembly are disengaged to remove the drained component of the slurry from the chamber.

20 Claims, 5 Drawing Sheets

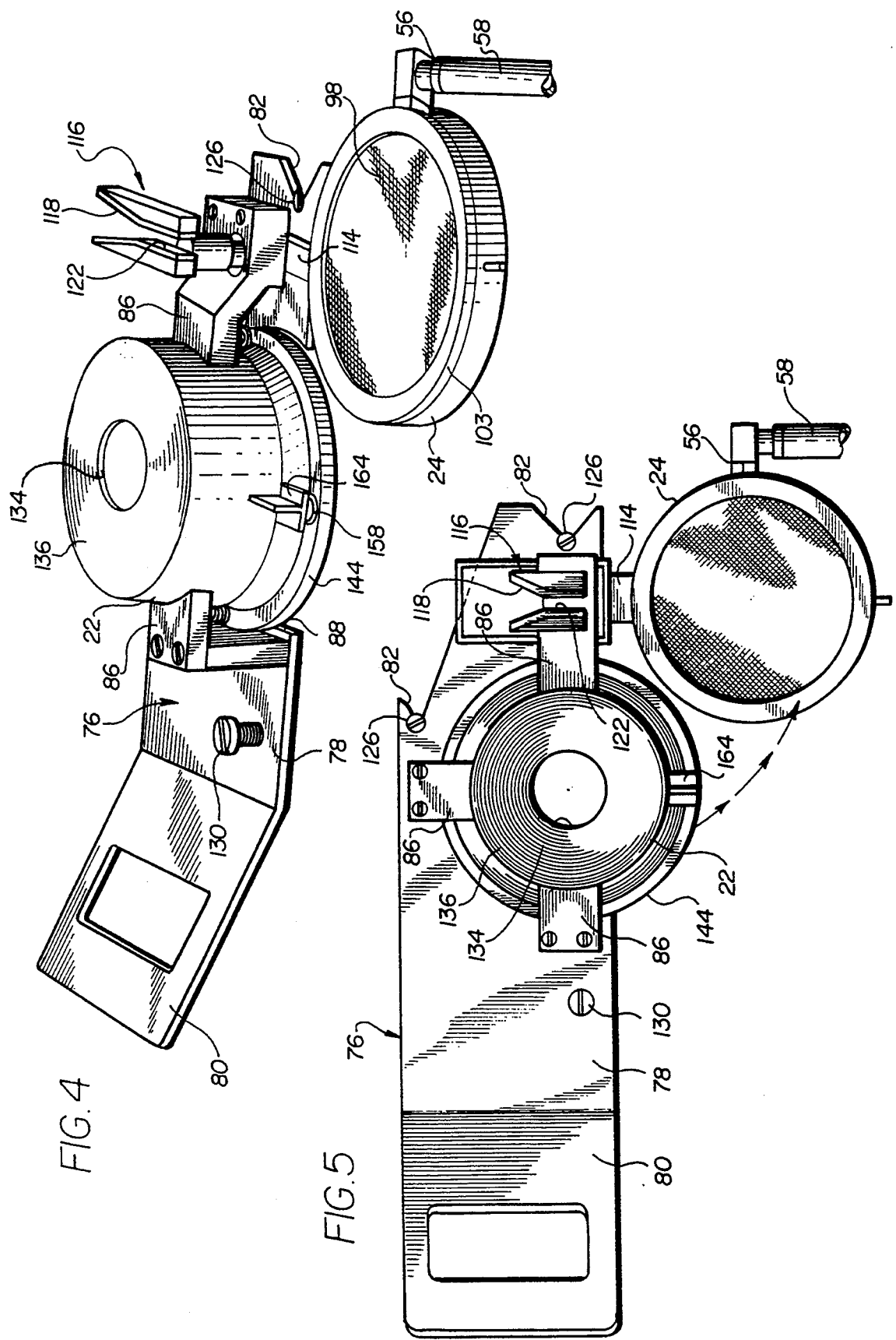

GROUNDS REMOVAL MECHANISM

BACKGROUND OF THE INVENTION

The present invention pertains to devices for disposing of spent beverage brewing substances from an automatic beverage brewing apparatus. More particularly, the present invention pertains to devices which receive a spent brewing material, containing waste liquids, from a beverage brewing apparatus and extract the waste liquid portion of the spent beverage brewing substance.

Automatic beverage brewing apparatus are commonly used in high volume applications such as restaurants, catering organizations and other high volume food production institutions. A typical automatic beverage brewing apparatus has a body which positions a funnel below a heated water source. The funnel contains a beverage brewing substance which is infused with heated water dispensed into the funnel to produce a brewed beverage. A brewed beverage is drained from the funnel into a serving decanter positioned underneath the funnel.

Such a beverage brewing apparatus requires that the beverage brewing substance be measured and deposited into the funnel for each batch of beverage produced. Additionally, this activity inherently requires the removal of the spent brewing substance after it has been infused with hot water and a brewed beverage produced therefrom. The need to fill the funnel with a beverage brewing substance and remove the spent substance from the funnel is labor intensive and prone to error due to mismeasurement or failure to remove the spent brewing substance from the funnel before producing another batch of brewed beverage.

Recently, automatic beverage brewing apparatus have been produced which substantially automate the beverage brewing process. Such an apparatus is shown in pending U.S. Pat. No. 5,134,925 to Bunn et al., issued Aug. 4, 1992. The apparatus shown in Bunn et al. includes an automatic brewing substance dispenser for dispensing a predetermined amount of beverage brewing substance into a brewing chamber. The brewing process is automated including automatically controlled brewing, dispensing, and chamber cleaning. After the brewing process is complete, the spent brewing substance is exhausted from the brewing chamber through a drain conduit into a spent beverage brewing substance basket.

A problem arises, however, in handling the spent brewing substance. The volume of the brewing substance and waste water requires frequent periodic removal and dumping. In other words, it would be desirable to accumulate the spent brewing substance from numerous brewing cycles in order to reduce the amount of manual labor required in servicing the brewing apparatus.

Another problem arises with the accumulation of spent brewing substance such that a large proportion of the waste product is waste water which is retained by the brewing substance itself during the brewing process. Additionally, it is common for brewing apparatus, such as the one shown in Bunn et al., to dispense waste water used to clean the brewing chamber into the common waste collection hopper. As such, a substantial quantity of water must be dealt with in disposing of the spent brewing substance. Therefore, it would be desirable to provide a device which drains off the liquid portion of the spent beverage brewing substance leaving only the dried spent brewing substance. Additionally, it is desirable to remove the liquid component of the spent beverage brewing substance in order to prevent the moist mixture from harboring and developing malodorous bacteria and organisms.

One possible solution to the waste material problem is to simply drain the combined slurry of spent brewing substance and waste water down a common drain. This solution, however, may not be feasible in some areas which restrict the amount of material which can be flushed down a waste sewer along with waste liquids. Further, the plumbing requirements to flush substantial quantities of solid materials may not be available or may be cost prohibitive since they are substantially greater than those for merely draining water and other liquids.

Another problem that arises with the disposal of spent brewing substances is that these substances create a great deal of steam and moisture which, if allowed to travel into the brewing apparatus, may create many problems. For example, when spent brewing substances are disposed an open collection basket the steam rises off of the substance as the substance cools in the collection basket. Since such baskets are positioned at the bottom of the brewing apparatus, the steam rising off of the spent brewing substance rises through the apparatus. While the brewing chamber is designed to brew substances, it is difficult to protect the internal components of the brewing apparatus from the detrimental effects of the rising steam. In particular, when the brewing apparatus includes a brewing substance dispenser, the steam may have an extremely detrimental effect on the brewing substance retained in the substance dispenser. For example, if ground coffee is retained in the substance dispenser, the steam may cause the ground coffee to cake and therefore not be properly dispensed into the brewing chamber.

As such, it is desirable to provide a device for disposing of spent beverage brewing substances which can be associated with an automatic beverage brewing apparatus to receive and retain spent brewing substances and waste water and drain the liquid portion therefrom. Further, it is desirable to provide a device which prevents steam from the spent brewing substance from escaping.

OBJECTS AND SUMMARY OF THE INVENTION

A general object of the present invention is to provide a device for collecting moist, spent brewing substances and waste water from a brewing apparatus and separating the liquid portion of such waste from the brewing substance to effectively dry the brewing substance.

Another object of the present invention is to provide a device which extracts a liquid portion of the moist, spent brewing substance from a collection area of the device and then removes the drained brewing substance.

Briefly, and in accordance with the foregoing, the present invention envisions a device for disposing of spent beverage brewing substances for use with a beverage brewing apparatus. The beverage brewing apparatus is the type which produces a brewed beverage from a beverage brewing substance disposed in a brewing chamber and infused with a liquid. A drain conduit extends from the brewing chamber and communicates with the substance disposal device for removing a slurry of moist beverage brewing substance and liquid waste from the brewing chamber of the apparatus into the disposal device. The disposal device includes a housing and a filter assembly which are controllably displaceable relative to each other. When the housing and filter assembly are assembled, they define a chamber. The filter assembly has a filter material which drains a liquid component out of the slurry when the slurry is dispensed into the chamber. A drain port communicates with the chamber for removing the liquid component from the chamber. An evacuating device communicates with the chamber and creates a vacuum on the chamber when activated to assist in removing the liquid component from the slurry. Once a substantial portion of the liquid component is removed from the slurry under the influence of the evacuating device, the housing and filter assembly are disengaged to remove the drained component of the slurry from the chamber.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 4 is a perspective view of the disposal device of the present invention in which a filter assembly has been disengaged from a housing;

FIG. 5 is a top plan view of the perspective as shown in FIG. 4 showing the movement of the filter assembly from beneath the housing;

DETAILED DESCRIPTION OF THE INVENTION

Figure 1:
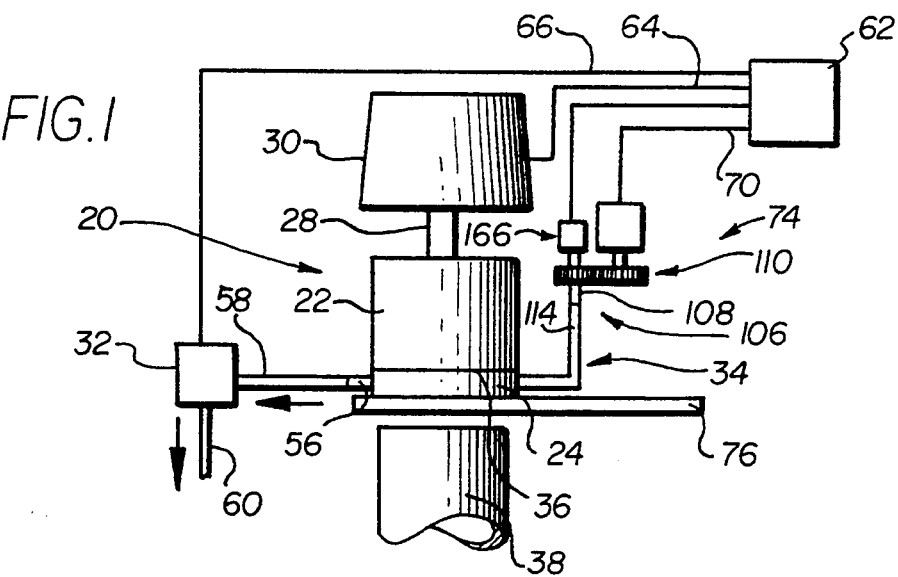
FIG. 1 is a simplified diagrammatic representation of a substance disposal device of the present invention.

While the invention may be susceptible to embodiment in different forms, there is shown in the drawings, and herein will be described in detail, embodiments of the invention with the understanding that the present disclosure is to be considered an exemplification of the principles of the invention and is not intended to limit the invention to that as illustrated and described herein.

Referring now to the drawings wherein like parts are designated by the same reference numerals throughout the figures, a spent beverage brewing substance disposal device 20 in accordance with the present invention is shown in FIG. 1. The disposal device 20 includes a housing 22 and a filter assembly 24 positioned below the housing 22. As better shown in FIG. 7, filter assembly 24 is engaged beneath the housing 22 to define a chamber 26. The housing 22 communicates with a drain conduit 28 which is connected to a beverage brewer 30. The beverage brewer 30 infuses a beverage brewing substance with heated water to produce a brewed beverage. When the beverage brewing cycle is completed, the spent beverage brewing substance, in the form of a liquid slurry, is drained through the drain conduit 28 into the chamber 26.

Means for evacuating the chamber, or evacuating means 32, communicates with the chamber 26 for removing a liquid component from the beverage brewing substance slurry. A drained component of the beverage brewing substance slurry remains in the chamber 26 for later disposal. When the drained component is to be disposed, beverage brewing substance removing means 34 operate to disengage the filter assembly 24 from beneath the housing 22 thereby removing the dried component of the beverage brewing substance from the chamber 26. As shown in the preferred embodiment of the present invention, the housing 22 is hollow having a mouth 36 disposed at a lower end (see, FIGS. 4 and 7). When the filter assembly 24 is displaced from below the housing 22, the drained component of the beverage brewing substance drops through the mouth 36 into an aligned waste collection container 38 or waste chute.

Figure 2:
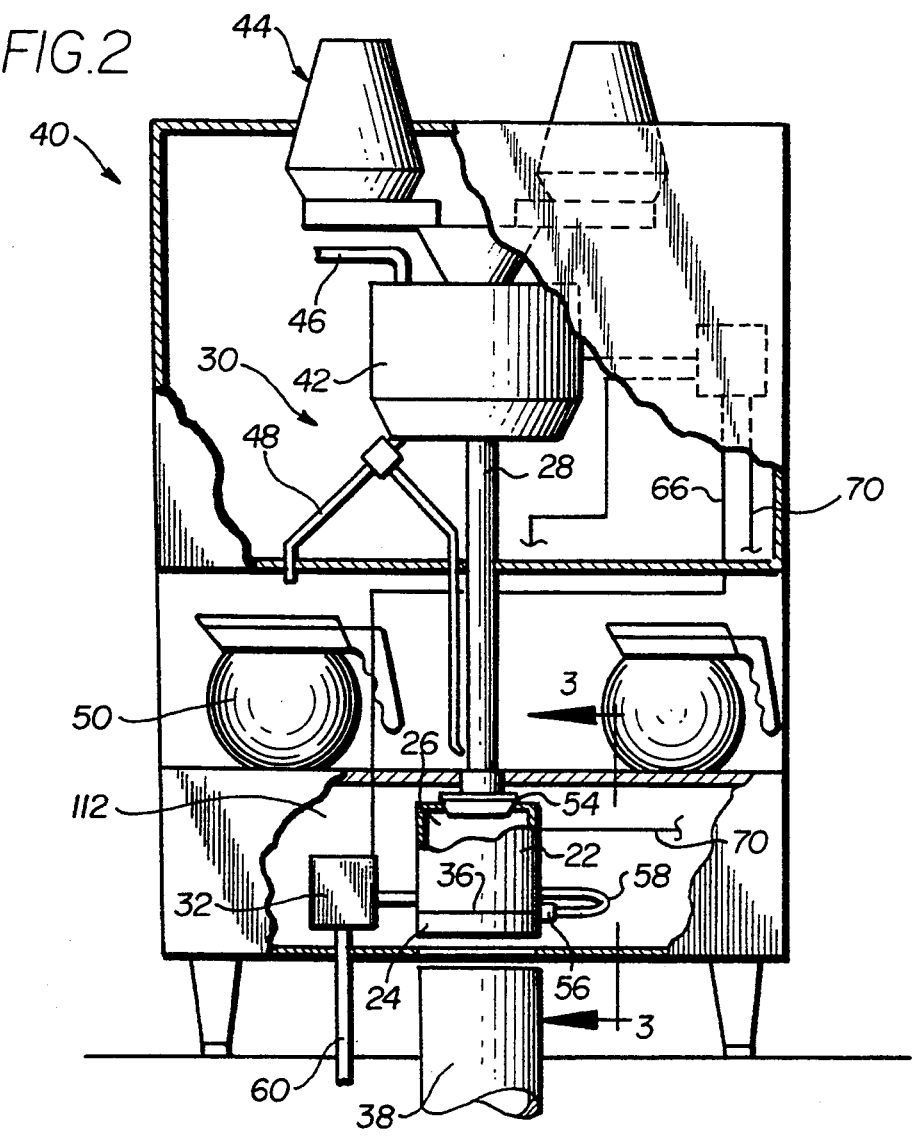
FIG. 2 is a partial fragmentary front elevational view of a diagrammatic representation of a beverage brewing apparatus employing the substance disposal device of the present invention.

Turning now to FIGS. 2-11 in order to provide further description of the structure and function of the present invention in greater detail, FIG. 2 places the disposal device in a more detailed, yet still somewhat diagrammatic representation of a beverage brewing apparatus 40. In the partial fragmentary front elevational view of the beverage brewing apparatus 40 as shown in FIG. 2, the disposal device 20 is positioned below the beverage brewing means 30. The beverage brewing means 30 includes a brew chamber 42 in which a beverage brewing substance from a hopper assembly 44 (or manually disposed into the brew chamber 62) is infused with a heated liquid dispensed from a heated liquid line 46. Once the brewing substance is infused, a brewed beverage is drained out of the brewing chamber 42 through a discharge line 48 for dispensing into a serving carafe 50. Upon the completion of such a beverage brewing cycle, the brew chamber 42 is automatically cleaned and a slurry of moist beverage brewing substance used during the brewing cycle and waste liquid are drained through the drain conduit 28.

The disposal device 20 is positioned below and in communication with the drain conduit 28. As shown in greater detail in FIG. 7, a top portion 52 mates with a bottom end 54 of the drain conduit 28 for directing the slurry into the housing 22 for separation. The liquid component separated out of the slurry is drained through a drain port which communicates with the filter assembly 24 and through a primary drain line 58 under the influence of the evacuation means 32. A secondary drain line 60 communicating with the evacuation means 32 drains the liquid component to an appropriate sewage line.

A controller 62 is coupled to the brewing apparatus 40 (shown diagrammatically by control line 64) to control the brewing and cleaning cycles. The controller 62 controls the quantity and type of brewing substance dispensed into the brewing chamber 42 and the quantity of water used to infuse the brewing substance. Further, the controller 62 operates the water lines of the beverage brewing apparatus 40 to rinse the brew chamber 42 at the end of a brewing cycle. As such, the production of brewed beverage is highly automated and involves minimum human interaction.

The substance disposal device 20 of the present invention further automates the brewing process such that a user essentially only has to place a brewing substance in the hopper assembly 44 and remove a drained material component from an accumulation container 38. The intervening steps in the brewing process are all preprogrammed in the controller 62 and carried out by the mechanisms in the beverage brewing apparatus 40 and the disposal device 20.

Figure 3:
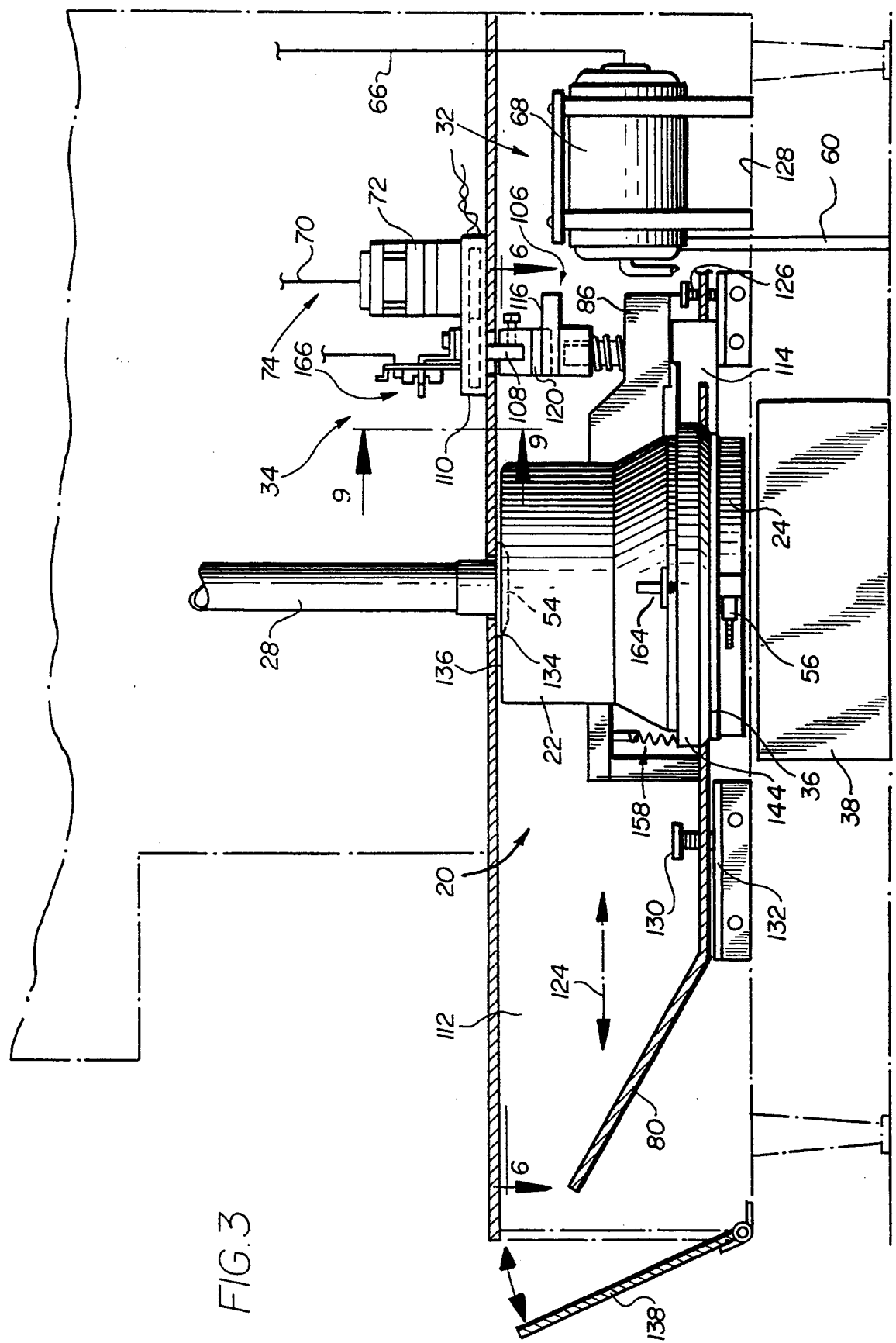
FIG. 3 is a partial fragmentary side elevational view taken along line 3—3 in FIG. 2 of the substance disposal device of the present invention.

With further reference to FIG. 3, the controller 62 is also used to control the disposal device 20 over control line 66 connected to an evacuating pump 68 of the evacuation means 32 and control line 70 connected to a motor 72 of a drive assembly 74 of the means for removing beverage brewing substance 34. At the end of a beverage brewing cycle, and during a rinse cycle, the controller 62 signals the pump 68 to activate the pump 68 and establish a vacuum in the chamber 26. When a slurry of beverage brewing substance is disposed into the chamber 26 through the drain conduit 28, the liquid component is stripped out of the spent beverage brewing substance.

After the liquid component of the beverage brewing substance is drained out of the filter assembly 24 through the drain port 56 and the primary drain line 58, the controller 62 signals the motor 72 (over control line 70) to actuate the drive assembly 74 of the beverage brewing substance removal means 34 to disengage the filter assembly 24 from beneath the housing 22. The resultant disengagement of the filter assembly 24 from beneath the housing 22 is shown with greater detail in FIGS. 4 and 5. The drained component of the beverage brewing substance is scraped off of the filter assembly 24 by the mouth 36 of the housing 22. Since the housing 22 remains stationary during the disposal process, the dried component falls into the collection container 38.

Having now described the overall structure and operation of the present invention, detailed structure and function of the disposal device 20 is presented hereinbelow. With reference to FIGS. 3–6, the disposal device 20 includes a support plate 76. The support plate 76 includes a housing mounting segment 78, a handle segment 80, and mounting slots 82. The housing 22 is attached to the mounting segment 78 by support brackets 86 attached at spaced apart locations to the outside of the housing 22 and to the mounting segment 78. An aperture is formed through the mounting segment 78 to allow free access to the inside of the housing 22.

Figure 7:
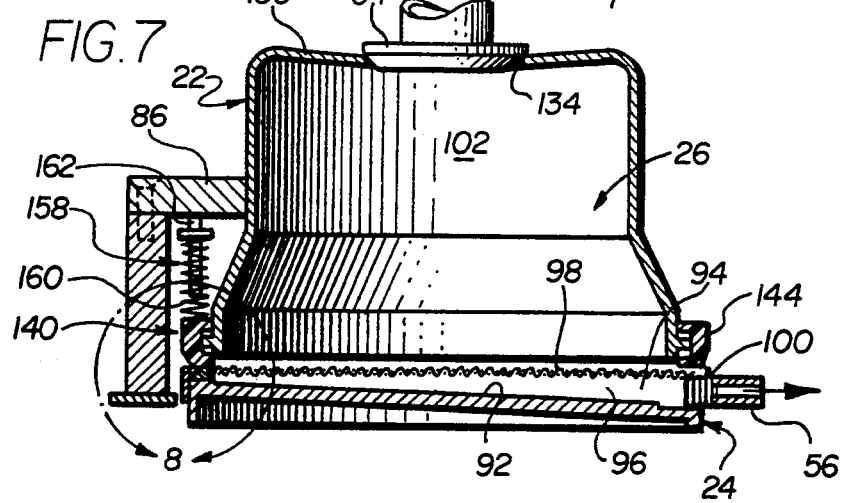
FIG. 7 is a cross sectional side elevational view taken along line 7—7 in FIG. 6 of the housing when the filter assembly is positioned therebeneath.

With reference to FIGS. 4, 5, 7, and 8, the filter assembly 24 further includes a pan 90 having a bottom or face 92 and walls 94 defining a collection cavity 96. A porous filter material 98 overlies the collection cavity 96 and is supported on a top edge 100 of the walls 94. As such, the filter material 98 defines a top surface suspended above the collection cavity 96. As shown in FIG. 7, the drain port 56 communicates with the collection cavity 96. The filter material 98 is retained on the top edge 100 by a bevel 101 which engages studs 103 on an outside surface 104 of the pan 90.

When a slurry of spent beverage brewing substance is dispensed into the chamber 26, a first cavity 102. The first cavity 102 is defined as the interior area of the housing 22. The liquid component is drained through the porous filter material 98 into the collection cavity or second cavity 96. The face 92 of the pan 90 is sloped towards the drain port 56 to further enhance the draining capabilities of the filter assembly 24.

The beverage brewing substance removing means 34 is shown diagrammatically in FIG. 1. The removing means 34 includes the drive assembly 74 and mechanical linkage 106 coupling the drive assembly 74 to the filter assembly 24. The mechanical linkage 106 is shown in greater detail in FIGS. 3–6. As shown, the mechanical linkage 106 includes a drive shaft 108 coupled to the drive motor 72 by means of a gear assembly 110. The drive shaft 108 extends from the gear assembly 110 into a lower compartment 112 which houses the disposal device 20. A swing arm 114 is attached to the outside surface 104 of the filter assembly 24 and is operatively attached to one of the support brackets 86. The swing arm 114 extends upwardly to cooperatively engage the downwardly directed drive shaft 108.

Figure 6:
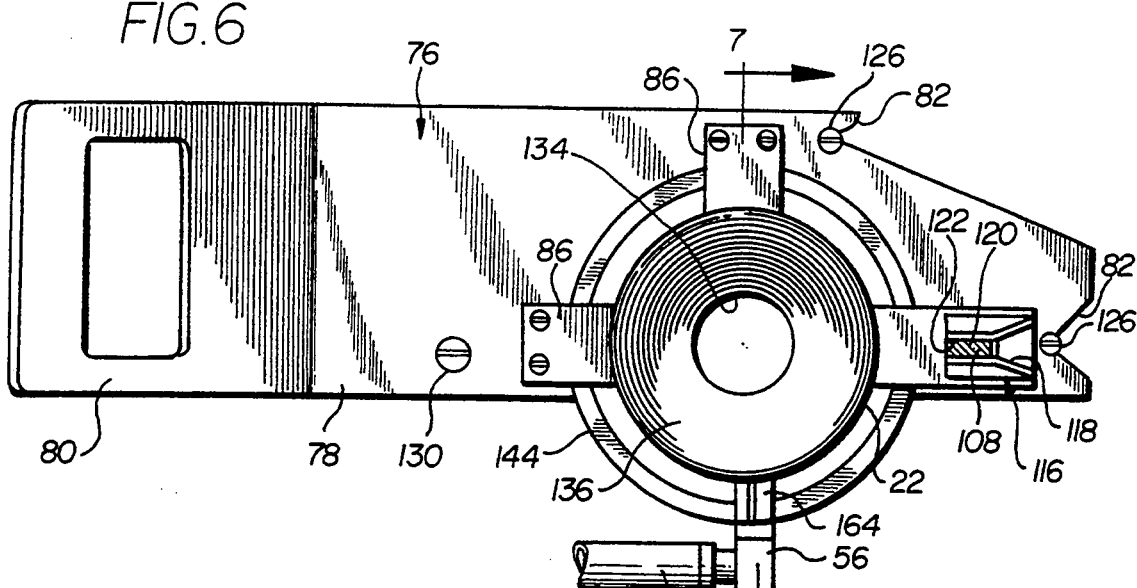
FIG. 6 is a top plan view of the substance disposal device as shown in FIG. 5 in which the filter assembly has been positioned beneath the housing.

As shown in FIGS. 3 and 6, the swing arm 114 has a channel socket 116. The channel socket is Y-shaped having an enlarged mouth 118. The enlarged mouth facilitates engagement with the drive shaft 108. The drive shaft 108 has flattened surfaces 120 which abut and engage generally parallel surfaces 122 of the channel socket 116. Once engaged, the drive shaft 108 rotates the engaged swing arm 114 to pivot the filter assembly 24 from beneath the housing 22.

An additional feature of the present invention is the ease with which it may be installed and removed from the lower compartment 112 of the coffee brewing apparatus 40. With reference to FIGS. 2–6, the disposal device 20 is slidable (as shown by arrow 124) into and out of engagement with stationary mounting posts 126 attached to a base plate 128. The mounting slots 82 engage the mounting posts 126 which have an enlarged opening to facilitate proper and positive engagement. When the two mounting posts 126 are engaged in the mounting slots 82, a locking pin 130 is in proper position for engaging an aperture formed in a locking bracket 132. During the installation operation, the flattened surfaces 120 of the drive shaft 108 cooperatively engage the channel socket 116. The flat surfaces 120 engage the parallel surfaces 122 of the channel socket 116 at a point where the mounting posts 126 engage the mounting slots 82. Additionally, the primary drain line 58 can be coupled to the drain port 56 either by mounting the drain line 58 over an outside surface of the drain port 56 or providing a quickly releasable coupling of a known construction. With the disposal device 20 positioned with the mounting posts 126 engaged in the slots 82, the locking pin 130 engaged in the locking bracket 132, and the drive shaft 108 engaged with the channel socket 116, the bottom end 54 of the conduit 28 engages a primary aperture 134 of the housing 22. A top surface 136 of the housing 22 slopes slightly inwardly and downwardly.

In order to remove the disposal device 20 from the lower compartment 112, an access door 138 is opened exposing the handle segment 80 which can be grasped during the removal operation. The locking pin 130 is disengaged from the locking bracket 132 whereupon the support plate 76 can be extracted from the compartment 112. During the removal operation, the channel socket 116 must be aligned as shown in FIG. 6 to permit disengagement of the drive shaft 108 therefrom. As such, the filter assembly 24 must be positioned underneath the housing 22 in order to remove the disposal device 20 from the compartment 112. When the disposal device 20 has been sufficiently removed from the compartment 112, the primary drain line 58 can be disengaged from the drain port 56.

Once removed, the entire disposal device 20 can be placed in an appropriate washing apparatus for periodic cleaning. The ability to clean the entire disposal device 20 without disassembly of the disposal device 20 is an important feature. This feature further increases the overall efficiency of the beverage brewing apparatus 40 and minimizes the work involved in using the disposal device 20.

Figure 8:
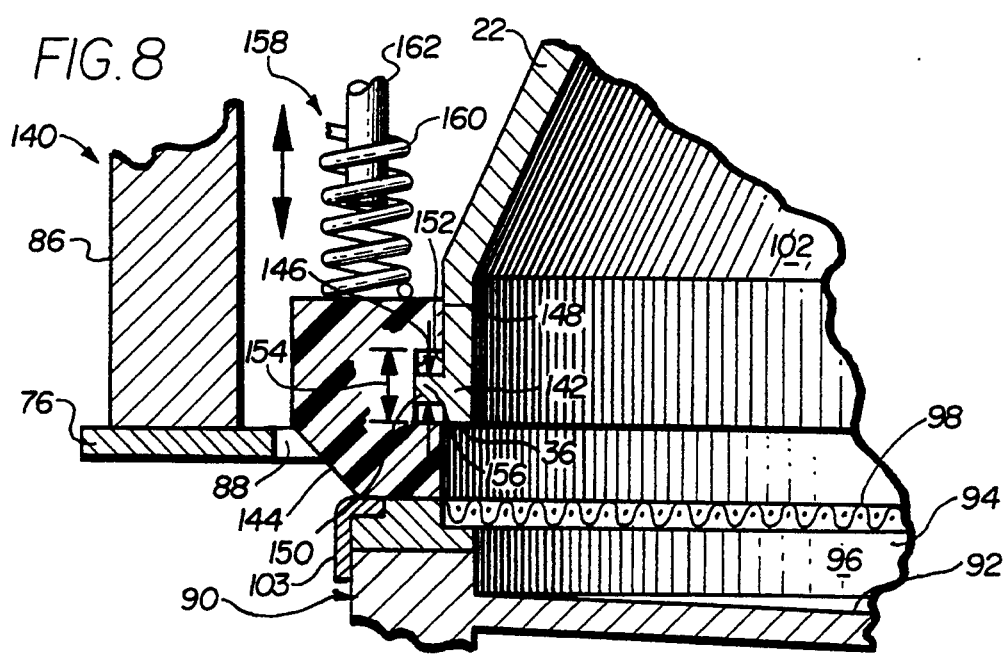
FIG. 8 is an enlarged partial fragmentary view of a biased ring attached to a rim of the housing.

Turning now to an additional feature of the means for removing beverage brewing substance 34 as shown in greater detail in FIGS. 7 and 8. The beverage brewing substance means 34 includes scraping means 140. The scraping means 140 is attached to a rim 142 of the housing 22. The scraping means 140 includes a ring 144 having an annular groove 146 formed on an inside surface 148 thereof. The annular groove 146 mates with an annular protrusion 150 formed on an outside surface 152 of the rim 142. The inside diameter of the ring 144 measured between opposed inside surfaces 148 is approximately equal to an outside diameter of the housing 22 measured at the rim 142. As such, the ring 144 is retained on the rim 142. The annular groove 146 has a width dimension 154 which is greater than a width dimension 156 of the annular protrusion 150. As such, the ring 144 is allowed to move upwardly and downwardly, or float, relative to the annular protrusion 150.

As shown in FIG. 8, the ring 144 is generally downwardly biased against the filter assembly 24 for maintaining a seal thereagainst. To provide a better seal, the ring 144 is formed of an elastomeric material such that a degree of sealing or compression is provided in the material such as when the chamber 26 is evacuated by the evacuating means 32. The ring 144 is maintained in the biased position by biasing means 158. The biasing means 158 includes a spring 160 held in a retained position against the ring 144 by a shaft 162 attached to each of the supporting brackets 86. An additional floating support bracket 164 is attached at a fourth position on the outside surface of the housing 22.

When the filter assembly 24 is disengaged from the housing 22, the biasing means 158 urges the ring 144 downwardly against the filter assembly 24. With reference to FIG. 7, as the filter assembly 24 is moved from beneath the housing 22, the ring 144 scrapes across the porous filter material 98 and therefore scrapes the drained component of the beverage brewing substance off of the porous filter material 98. As mentioned hereinabove, the ring 144 is an elastomeric material and therefore does net damage the porous filter material 98.

Figure 9:
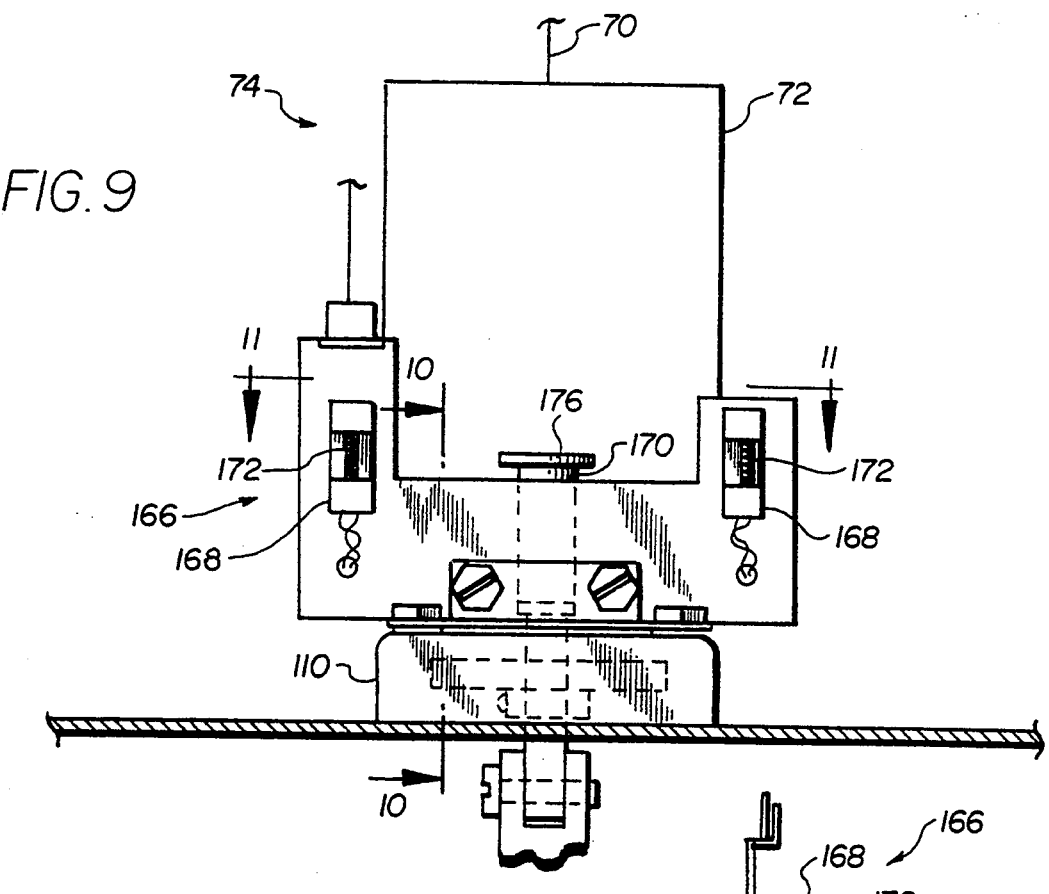
FIG. 9 is an enlarged elevational view of a sensing device for sensing the engagement or disengagement of the filter assembly relative to the housing.
Figure 10:
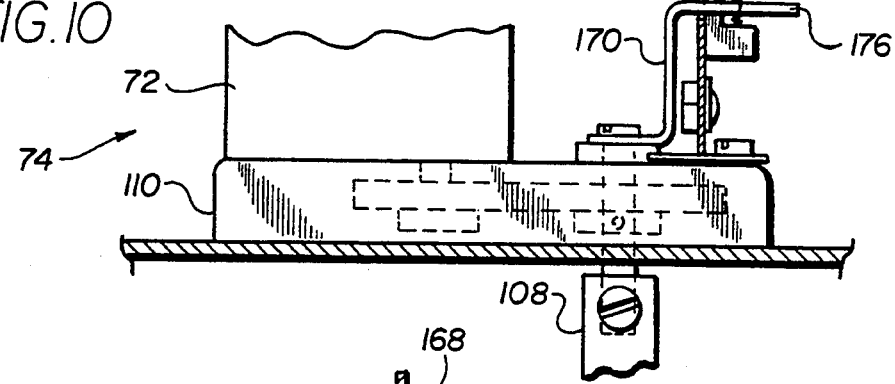
FIG. 10 is a partial fragmentary cross sectional elevational view taken along line 10—10 in FIG. 9 of the sensing device.
Figure 11:
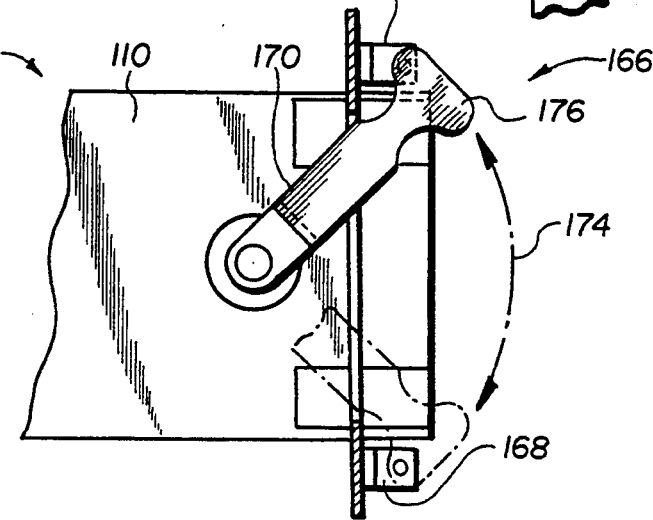
FIG. 11 is a partial fragmentary plan view taken along line 11—11 in FIG. 9 of the sensing device showing operation of a detection arm with respect to an optical detector.

When the filter assembly 24 is engaged and disengaged from the housing 22, the position of the filter assembly 24 relative to the housing 22 is sensed by sensing means 166. The sensing means 166 is operatively associated with the drive assembly 74 and takes advantage of the rotation of the drive shaft 108 to determine the position of the filter assembly 24. With reference to FIGS. 9–11, the sensing means 166 is shown in a front elevation, side elevation, and plan view. The sensing means 166 includes at least one optical detector 166 (two optical detectors are provided in the preferred embodiment illustrated herein) and a detection arm 170 attached to the drive shaft 108. The optical detectors include a sensing area 172 which provides a control signal when a body is placed therebetween. As shown in FIG. 11, the detection arm rotates through a path (as shown by phantom line 174) which places a hammerhead portion 176 in the sensing area 172 at either extreme end of the path 174. Therefore, since the detection arm 170 is attached to the drive shaft 108, rotation of the drive shaft 108 rotates the detection arm 170 which translates the position of the filter assembly 24, attached to the drive shaft 108, into a control signal by means of the optical detectors 168.

With reference to FIGS. 4 and 5, the filter assembly 24 is rotated out of the position beneath the housing 22 by a one-quarter turn in the swing arm 114. The movement of the swing arm 114 translates to a one-quarter turn, or a 90° angle of travel of the detection arm 170. By using two optical detectors 168, an engaged position and a completely disengaged position may be sensed. The ability to sense an engaged position should be evident since the evacuating means 132 would not properly function unless the filter assembly 24 is fully engaged with the housing to form a seal with the ring 144.

The completely disengaged position of the filter assembly 24 is important so that the ring 144 is fully disengaged and scrapes the entire surface of the porous filter material 98 thereby assuring complete removal of the dried component of the beverage brewing substance therefrom.

In use, the disposal device 20 of the present invention attached to the support plate 76 is slidable into engagement in the lower compartment 112 of the beverage brewing apparatus 40. When the disposal device 20 is positioned in the compartment 112, the lower portion 54 of the drain conduit 28 engages the primary aperture 134 of the housing 22. Engagement between the lower portion 54 and the aperture 134 prevents the escape of steam into the beverage brewing apparatus 40 which might otherwise detrimentally affect the operation of the apparatus above the lower compartment 112. Additionally, the support plate 76 positively engages mounting posts 126 which are attached to the base plate 128 of the compartment 112. The posts 126 engage the mounting slots 82 whereupon the locking pin 130 engages the locking bracket 132. With the support plate 76 thus positioned, the drive shaft 108 engages the channel socket 116.

When a charge of spent beverage brewing substance slurry is dispensed through the drain conduit 28 into the first cavity 102 of the chamber 26, a liquid component drains through the porous filter material 98 into the second cavity or collection cavity 96. The liquid component drains downwardly along the sloped surface into the drain port 56 under the influence of a vacuum which is created by the evacuating means 32. The downwardly biased ring 144 forms a seal between the housing 22 and the filter assembly 24 while the chamber 26 is evacuated. The liquid component removed from the slurry is drained through the drain port 56 and away from the beverage brewing apparatus 40 by way of the primary and secondary drain lines 58, 60.

After a predetermined period of time, the evacuating means 32 ceases to pull a vacuum on the chamber 26 whereupon the drive assembly 74 operates to rotate the swing arm 114 to disengage the filter assembly 24 from beneath the housing 22. While the filter assembly 24 is disengaged from the housing 22, the ring 144, downwardly biased by the biasing means 158, scrapes the dried component of the beverage brewing substance off of the porous filter material 98. When fully disengaged as shown in FIGS. 4 and 5, the entire surface of the filter material 98 of the filter assembly 24 has been scraped to remove the dried component of the beverage brewing substance. The dried beverage brewing substance falls through the mouth 36 of the housing 22 and through the aperture 88 of the support plate 76. The dried component falls into a collection hopper 38 for disposal at an appropriate time.

The drive means 74 then rotates the swing arm 114 to reengage the filter assembly 24 beneath the housing 22. While the filter assembly 24 is reengaged, the ring 144 "floats" within the range of the width dimension 154 of the internal groove 146.

When the disposal device 20 needs to be cleaned, the locking pin 130 is disengaged and the handle 80 is grasped to remove the device 20 from the compartment 112. The entire device 20 may be placed in a cleaning apparatus since all the components of the device are captive and will not become dislodged during a regular cleaning.

While a preferred embodiment of the present invention has been shown and described, it is envisioned that those skilled in the art may devise various modifications to the present invention without departing from the spirit and scope of the appended claims. The invention is not intended to be limited by the foregoing description.

The invention claimed is:

1. A spent beverage brewing substance disposal device for use with a beverage brewing apparatus, said beverage brewing apparatus having means for producing a brewed beverage from a beverage brewing substance disposed therein by infusion with a liquid, a drain conduit in communication with and extending from said beverage brewing means for removing a slurry of spent beverage brewing substance and liquid used to infuse the beverage brewing substance from said beverage brewing means after producing a brewed beverage, said disposal device comprising:
   a housing communicating with said drain conduit from said beverage brewing means for receiving said slurry therefrom;
   a filter assembly releasably engagable with said housing for retaining the beverage brewing substance component of said slurry and draining the liquid component from said slurry;
   said housing and said filter assembly defining a chamber, said chamber being selectively sealable;
   means for evacuating said chamber when said chamber sealed condition, said evacuating means being operatively associated with said chamber to draw a vacuum on said sealed chamber to promote extraction of the liquid component from said beverage brewing substance component of said slurry through said filter assembly;
   a drain port communicating with said chamber and said evacuating means for removing the extracted liquid component from said chamber; and
   means for removing said beverage brewing substance component from said chamber after said evacuating means has evacuated said chamber to remove said liquid component of said slurry.

2. A spent beverage brewing substance disposal device for use with a beverage brewing apparatus as recited in claim 1, said filter assembly further comprising:
   a pan having a face and walls defining a collection cavity; and
   porous filter material covering said collection cavity, said slurry of beverage brewing substance and liquid being deposited on said porous filter material covering said collection cavity, said liquid component draining through said porous filter material under the influence of said evacuation means, said drain port communicating with said collection cavity for removing liquid therefrom.

3. A spent beverage brewing substance disposal device for use with a beverage brewing apparatus as recited in claim 2, wherein said face of said pan slopes downwardly towards said drain port for facilitating draining of liquid into said drain port.

4. A spent beverage brewing substance disposal device for use with a beverage brewing apparatus as recited in claim 2, said evacuating means further comprising:
   an evacuating pump for reducing the ambient pressure in said chamber; an evacuation conduit communicating with said chamber and said evacuating pump, wherein operation of said evacuating pump reduces the ambient pressure in said chamber and induces the separation of said liquid component of said slurry through said porous filter material leaving said beverage brewing substance on said filter material.

5. A spent beverage brewing substance disposal device for use with a beverage brewing apparatus as recited in claim 1, further comprising:
   means for sensing disengagement of said housing and said filter assembly operatively associated with at least one of said housing and said filter assembly.

6. A spent beverage brewing substance disposal device for use with a beverage brewing apparatus as recited in claim 1, said means for removing said beverage brewing substance component further comprising:
   a drive assembly operatively associated with one of said housing and a said filter assembly for controllably disengaging said filter assembly and said housing, disengagement of said filter assembly from said housing removing said beverage brewing substance component from said filter assembly.

7. A spent beverage brewing substance disposal device for use with a beverage brewing apparatus said beverage brewing apparatus having means for producing a brewed beverage from a beverage brewing substance disposed therein by infusion with a liquid, a drain conduit in communication with and extending from said beverage brewing means for removing a slurry of spent beverage brewing substance and liquid used to infuse the beverage brewing substance from said beverage brewing means after producing a brewed beverage, said disposal device comprising:
   a housing communicating with said drain conduit from said beverage brewing means for receiving said slurry therefrom;
   a filter assembly releasably engagable with said housing for retaining the beverage brewing substance component of said slurry and draining the liquid component from said slurry;
   said housing and said filter assembly defining a chamber, said chamber being selectively sealable;

means for evacuating said chamber operatively associated with said chamber to extract the liquid component from said beverage brewing substance component of said slurry through said filter assembly;

a drain port communicating with said chamber for removing the extracted liquid component from said chamber;

means for removing said beverage brewing substance component from said chamber after said evacuating means has evacuated said chamber to remove said liquid component of said slurry, said means for removing said beverage brewing substance component having a drive assembly operatively associated with one of said housing and a said filter assembly for controllably disengaging said filter assembly and said housing, disengagement of said filter assembly from said housing removing said beverage brewing substance component from said filter assembly, said drive assembly including:

a drive motor for controllably disengaging said filter assembly from said housing; and a swing arm attached to said filter assembly, said swing arm being operatively associated with said drive motor for controllably engaging and disengaging said filter assembly and said housing.

8. A spent beverage brewing substance disposal device for use with a beverage brewing apparatus, said beverage brewing apparatus having means for producing a brewed beverage from a beverage brewing substance disposed therein by infusion with a liquid, a drain conduit in communication with and extending from said beverage brewing means for removing a slurry of spent beverage brewing substance and liquid used to infuse the beverage brewing substance from said beverage brewing means after producing a brewed beverage, said disposal device comprising:

a housing communicating with said drain conduit from said beverage brewing means for receiving said slurry therefrom;

a filter assembly releasably engagable with said housing retaining the beverage brewing substance component of said slurry and draining the liquid component from said slurry;

said housing and said filter assembly defining a chamber, said chamber being selectively sealable;

means for evacuating said chamber operatively associated with said chamber to extract the liquid component from said beverage brewing substance component of said slurry through said filter assembly;

a drain port communicating with said chamber for removing the extracted liquid component from said chamber; and means for removing said beverage brewing substance component from said chamber after said evacuating means has evacuated said chamber to remove said liquid component of said slurry;

a drive assembly of said means for removing said beverage brewing substance component operatively associated with one of said housing and a said filter assembly for controllably disengaging said filter assembly and said housing, disengagement of said filter assembly from said housing removing said beverage brewing substance component from said filter assembly, said drive assembly including a drive motor for controllably disengaging said filter assembly from said housing, and a swing arm attached to said filter assembly, said swing arm being operatively associated with said drive motor for controllably engaging and disengaging said filter assembly and said housing means for sensing disengagement of said filter assembly and said housing operatively associated with said drive motor, said sensing means including at least one optical detector positioned proximate to said drive motor, and a detection arm attached to said drive motor in an operative relation with said at least one optical detector such that movement of said detection arm attached to said drive motor is detected by said optical detector for indicating engagement and disengagement of said filter assembly and said housing.

9. A spent beverage brewing substance disposal device for use with a beverage brewing apparatus said beverage brewing apparatus having means for producing a brewed beverage from a beverage brewing substance disposed therein by infusion with a liquid, a drain conduit in communication with and extending from said beverage brewing means for removing a slurry of spent beverage brewing substance and liquid used to infuse the beverage brewing substance from said beverage brewing means after producing a brewed beverage, said disposal device comprising:

a housing communicating with said drain conduit from said beverage brewing means for receiving said slurry therefrom;

a filter assembly releasably engagable with said housing for retaining the beverage brewing substance component of said slurry and draining the liquid component from said slurry;

said housing and said filter assembly defining a chamber, said chamber being selectively sealable;

means for evacuating said chamber operatively associated with said chamber to extract the liquid component from said beverage brewing substance component of said slurry through said filter assembly;

a drain port communicating with said chamber for removing the extracted liquid component from said chamber;

means for removing said beverage brewing substance component from said chamber after said evacuating means has evacuated said chamber to remove said liquid component of said slurry, said filter assembly including a pan having a face and walls defining a collection cavity;

porous filter material covering said collection cavity, said slurry of beverage brewing substance and liquid being deposited on said porous filter material covering said collection cavity, said liquid component draining through said porous filter material under the influence of said evacuation means, said drain port communicating with said collection cavity for removing liquid therefrom; said means for removing said beverage brewing substance component including a drive assembly operatively associated with said one of said filter assembly and said housing for controllably engaging and disengaging said filter assembly and said housing; and means for scraping a drained component of said beverage brewing substance off of said porous filter material, said scraping means being attached to a rim of said housing abutting said filter assembly, said scraping means passing over said porous filter material for removing said beverage brewing substance component from said porous filter material when said filter assembly is disengaged from said housing by said drive assembly.

10. A spent beverage brewing substance disposal device for use with a beverage brewing apparatus, said beverage brewing apparatus having means for producing a brewed beverage from a beverage brewing substance disposed therein by infusion with a liquid, a drain conduit in communication with and extending from said beverage brewing means for removing a slurry of spent beverage brewing substance and liquid used to infuse the beverage brewing substance from said beverage brewing means after producing a brewed beverage, said disposal device comprising:

a housing communicating with said drain conduit from said beverage brewing means for receiving said slurry therefrom;

a filter assembly releasably engagable with said housing for retaining the beverage brewing substance component of said slurry and draining the liquid component from said slurry, said filter assembly including a pan having a face and walls defining a collection cavity, and a porous filter material covering said collection cavity, said slurry of beverage brewing substance and liquid being deposited on said porous filter material covering said collection cavity, said liquid component draining through said porous filter material under the influence of said evacuation means, said drain port communicating with said collection cavity for removing liquid therefrom;

said housing and said filter assembly defining a chamber, said chamber being selectively sealable;

means for evacuating said chamber operatively associated with said chamber to extract the liquid component from said beverage brewing substance component of said slurry through said filter assembly;

a drain port communicating with said chamber for removing the extracted liquid component from said chamber;

means for removing said beverage brewing substance component from said chamber after said evacuating means has evacuated said chamber to remove said liquid component of said slurry, said removing means including a drive assembly operatively associated with said one of said filter assembly and said housing for controllably engaging and disengaging said filter assembly and said housing, and means for scraping a drained component of said beverage brewing substance off of said porous filter material, said scraping means being attached to a rim of said housing abutting said filter assembly, said scraping means passing over said porous filter material for removing said beverage brewing substance component from said porous filter material when said filter assembly is disengaged from said housing by said drive assembly said scraping means including a ring movably retained on said rim of said housing, and means for biasing said ring operatively retained between said housing and said ring for biasing said ring into abutment with said filter assembly to scrape said beverage brewing substance component off of said porous filter material when said filter assembly is disengaged from said housing and to form a seal between said ring and said filter assembly when said filter assembly is engaged with said housing.

11. A spent beverage brewing substance disposal device in combination with a beverage brewing apparatus, said beverage brewing apparatus having means for producing a brewed beverage from a beverage brewing substance disposed therein by infusion with a liquid, a drain conduit in communication with and extending from said beverage brewing apparatus for removing waste liquids and a slurry of spent beverage brewing substance and liquid used to infuse the beverage brewing substance from said beverage brewing apparatus after producing a brewed beverage, said disposal device comprising:

a hollow housing communicating with said drain conduit from said beverage brewing apparatus for receiving said slurry therefrom;

a filter assembly releasably engageable with said hollow housing for retaining the beverage brewing substance component of said slurry and draining the liquid component from said slurry;

a pan of said filter assembly having a bottom and walls defining a collection cavity;

porous filter material overlying said collection cavity, said slurry of beverage brewing substance and liquid being deposited on said porous filter material overlying said collection cavity, said liquid draining through said porous filter material into said collection cavity;

said hollow housing and said filter assembly defining a chamber said housing and said filter assembly being selectively sealable;

an evacuating pump communicating with said collection cavity for drawing a vacuum on said chamber when said housing and filter assembly are in a sealed condition to promote the extraction of said liquid component of said slurry through said porous filter material on which said slurry is disposed and of said pan of said filter assembly to separate said liquid component from said beverage brewing substance component; and means for removing said beverage brewing substance component from said chamber after said evacuating pump has removed said liquid component of said slurry.

12. A spent beverage brewing substance disposal device for use with a beverage brewing apparatus as recited in claim 11, wherein said bottom of said pan slopes towards said drain port for facilitating draining of liquid into said drain port.

13. A spent beverage brewing substance disposal device for use with a beverage brewing apparatus as recited in claim 11, said means for removing said beverage brewing substance component further comprising:

a drive motor for controllably disengaging said housing from said filter assembly; and a swing arm attached to said filter assembly, said swing arm being selectively couplable with said drive motor for controllably moving said swing arm and attached filter assembly to engage and disengage said filter assembly with said housing.

14. A spent beverage brewing substance disposal device for use with a beverage brewing apparatus said beverage brewing apparatus having means for producing a brewed beverage from a beverage brewing substance disposed therein by infusion with a liquid, a drain conduit in communication with and extending from said beverage brewing apparatus for removing waste liquids and a slurry of spent beverage brewing substance and liquid used to infuse the beverage brewing substance from said beverage brewing apparatus after producing a brewed beverage, said disposal device comprising:

a hollow housing communicating with said drain conduit from said beverage brewing apparatus for receiving said slurry therefrom;

a filter assembly releasably engageable with said hollow housing for retaining the beverage brewing substance component of said slurry and draining the liquid component from said slurry;

a pan of said filter assembly having a bottom and walls defining a collection cavity;

porous filter material overlying said collection cavity, said slurry of beverage brewing substance and liquid being deposited on said porous filter material overlying said collection cavity, said liquid draining through said porous filter material into said collection cavity;

said hollow housing and said pan defining a chamber;

an evacuating pump communicating with said chamber for drawing said liquid component through said porous filter material and out of said pan of said filters assembly to separate said liquid component from said beverage brewing substance component;

means for removing said beverage brewing substance component from said chamber after said evacuating pump has removed said liquid component of said slurry, said means for removing said beverage brewing substance component including a drive motor for controllably disengaging said housing from said filter assembly, a swing arm attached to said filter assembly, said swing arm being selectively couplable with said drive motor for controllably moving said swing arm and attached filter assembly to engage and disengage said filter assembly with said housing; and means for sensing disengagement of said filter assembly and said housing, said sensing means being operatively associated with said drive motor, said sensing means including at least one optical detector positioned proximate to said drive motor; and a detection arm operatively associated with said drive motor and with said at least one optical detector such that movement of said detection arm is detected by said optical detector for indicating engagement and disengagement of said housing and said filter assembly.

15. A spent beverage brewing substance disposal device for use with a beverage brewing apparatus said beverage brewing apparatus having means for producing a brewed beverage from a beverage brewing substance disposed therein by infusion with a liquid, a drain conduit in communication with and extending from said beverage brewing apparatus for removing waste liquids and a slurry of spent beverage brewing substance and liquid used to infuse the beverage brewing substance from said beverage brewing apparatus after producing a brewed beverage, said disposal device comprising:

a hollow housing communicating with said drain conduit from said beverage brewing apparatus for receiving said slurry therefrom;

a filter assembly releasably engageable with said hollow housing for retaining the beverage brewing substance component of said slurry and draining the liquid component from said slurry;

a pan of said filter assembly having a bottom and walls defining a collection cavity;

porous filter material overlying said collection cavity, said slurry of beverage brewing substance and liquid being deposited on said porous filter material overlying said collection cavity, said liquid draining through said porous filter material into said collection cavity;

said hollow housing and said pan defining a chamber;

an evacuating pump communicating with said chamber for drawing said liquid component through said porous filter material and out of said pan of said filter assembly to separate said liquid component from said beverage brewing substance component;

means for removing said beverage brewing substance component from said chamber after said evacuating pump has removed said liquid component of said slurry, said means for removing said beverage brewing substance component including a drive assembly operatively associated with said one of said housing and a said filter assembly for controllably moving said housing and said filter assembly out of engagement; and means for scraping said beverage brewing substance off of said porous filter material, said scraping means being attached to a rim of said housing abutting said filter assembly, said scraping means passing over said porous filter material for removing said beverage brewing substance component from said porous filter material when said filter assembly is disengaged from said bell portion by said drive assembly.

16. A spent beverage brewing substance disposal device for use with a beverage brewing apparatus, said beverage brewing apparatus having means for producing a brewed beverage from a beverage brewing substance disposed therein by infusion with a liquid, a drain conduit in communication with and extending from said beverage brewing apparatus for removing waste liquids and a slurry of spent beverage brewing substance and liquid used to infuse the beverage brewing substance from said beverage brewing apparatus after producing a brewed beverage, said disposal device comprising:

a hollow housing communicating with said drain conduit from said beverage brewing apparatus for receiving said slurry therefrom;

a filter assembly releasably engagable with said hollow housing for retaining the beverage brewing substance component of said slurry and draining the liquid component from said slurry;

a pan of said filter assembly having a bottom and walls defining a collection cavity;

porous filter material overlying said collection cavity, said slurry of beverage brewing substance and liquid being deposited on said porous filter material overlying said collection cavity, said liquid draining through said porous filter material into said collection cavity;

said hollow housing and said pan defining a chamber;

an evacuating pump communicating with said chamber for drawing said liquid component through said porous filter material and out of said pan of said filter assembly to separate said liquid component from said beverage brewing substance component; and means for removing said beverage brewing substance component from said chamber after said evacuating pump has removed said liquid component of said slurry said removing means including a drive assembly operatively associated with said one of said housing and a said filter assembly for controllably moving said housing and said filter assembly out of engagement, and means for scraping said beverage brewing substance off of said porous filter material, said scraping means being attached to a rim of said housing abutting said filter assembly, said scraping means passing over said porous filter material for removing said beverage brewing substance component from said porous filter material when said filter assembly is disengaged from said bell portion by said drive assembly said means for scraping said filter material including a ring movably retained on said rim of said housing; and means for biasing said ring operatively retained between said housing and said ring for biasing said ring into abutment with said filter assembly to scrape said beverage brewing substance component off of said porous filter material when said filter assembly is disengaged from said housing and to form a seal between said ring and said filter assembly when said filter assembly is engaged with said housing.

17. A method of disposing of a spent beverage brewing substance produced by a beverage brewing apparatus, said method comprising the steps of:

providing a selectively sealable chamber, said chamber defining a first cavity and a second cavity, a porous filter material being disposed between said first and second cavities, said first and second cavities being selectively disengageable and sealable;

engaging said first and second cavities to form said sealed chamber;

discharging a slurry of beverage brewing substance and waste liquid produced by said beverage brewing apparatus into said sealed chamber onto said porous filter material above said second cavity;

evacuating said sealed chamber to extract said waste liquid from said slurry through said porous filter material into said second cavity leaving said beverage brewing substance on said filter material in said first cavity of said chamber;

draining the extracted waste liquid from said sealed chamber; and removing the drained beverage brewing substance from said chamber.

18. A method of disposing of a spent beverage brewing substance produced by a beverage brewing apparatus, said method comprising the steps of:

discharging a slurry of beverage brewing substance and waste liquid produced by said beverage brewing apparatus into a controllably sealable chamber, said chamber having a first cavity and a second cavity with a porous filter material disposed therebetween, said first cavity and said second cavity being controllably disengageable;

evacuating said chamber to extract said waste liquid from said slurry through said porous filter material into said second cavity leaving said beverage brewing substance on said filter material in said first cavity of said chamber;

draining the extracted waste liquid from said chamber;

disengaging said first cavity and said second cavity to remove the beverage brewing substance therefrom; and passing said first cavity over said second cavity to which said porous filter material is attached for scraping said beverage brewing substance off of said porous filter material.

19. A spent beverage brewing substance disposal device for use with a beverage brewing apparatus having a drain conduit for discharging a slurry of spent brewing substances and liquid, said device comprising:

a housing having a first and second portion, said first and second portions defining a separable controllably sealable chamber, an inlet port connectable with said conduit and an outlet port, a filter disposed in said sealable chamber between said inlet and outlet ports for separating said substance from the liquid in said slurry flowing between said ports and one of said first and second portions being movable relative to said filter for scraping any accumulated brewing substance from the filter and discharging such accumulated substance from the housing.

20. A spent beverage brewing substance disposal device for removing a slurry of a spent substance and liquid and separating the spent substance from the liquid comprising:

a housing including a first upper part having a slurry inlet port and a lower part having a liquid drain port, said upper part and said lower part defining a separable controllably sealable chamber, a filter disposed between said upper and lower housing parts for separating and accumulating spent substance from liquid in the slurry, said filter being operatively associated with said lower housing part, and means mounting said filter and at least a portion of said upper housing part for relative movement for scraping any accumulated spent substance from the filter and discharging such accumulated substance from the housing.

* * * * *

UNITED STATES PATENT AND TRADEMARK OFFICE
CERTIFICATE OF CORRECTION

PATENT NO. : 5,372,728
DATED : December 13, 1994
INVENTOR(S) : William E. Midden It is certified that error appears in the above-indentified patent and that said Letters Patent is hereby corrected as shown below:

Column 7, Line 59 "net" should be —-not—-

Column 9, Lines 55-56 "chamber sealed" should be —- chamber is in a sealed —-

Signed and Sealed this

Fourth Day of April, 1995

BRUCE LEHMAN

*Attest:*

*Attesting Officer*       *Commissioner of Patents and Trademarks*